United States Patent [19]

Okinoshima et al.

[11] Patent Number: 5,166,293
[45] Date of Patent: Nov. 24, 1992

[54] SILICONE RUBBER COMPOSITIONS AND CURED PRODUCTS THEREOF

[75] Inventors: Hiroshige Okinoshima; Tsutomu Kashiwagi, both of Annaka, Japan

[73] Assignee: Shin-Etsu Chemical Co., Ltd., Tokyo, Japan

[21] Appl. No.: 704,384

[22] Filed: May 23, 1991

[30] Foreign Application Priority Data

May 29, 1990 [JP] Japan .................... 2-140853

[51] Int. Cl.⁵ .................................. C08G 77/06
[52] U.S. Cl. .......................... 528/15; 528/31; 528/32; 528/33; 528/39
[58] Field of Search ............. 528/15, 31, 32, 39, 528/33

[56] References Cited

U.S. PATENT DOCUMENTS

| | | | |
|---|---|---|---|
| 4,082,726 | 4/1978 | Mine et al. | 528/31 |
| 4,252,933 | 2/1981 | Sumida | 528/31 |
| 5,006,580 | 4/1991 | Kasuya et al. | 528/31 |

FOREIGN PATENT DOCUMENTS 575836 10/1975 Japan .
53-13508 3/1977 Japan .

Primary Examiner—John C. Bleutge
Assistant Examiner—Margaret W. Glass

[57] ABSTRACT

A silicone rubber composition comprising (A) a vinyl-containing diorganopolysiloxane, (B) an organohydrogenpolysiloxane, and (C) a platinum catalyst is improved in adhesion to metallic, ceramic and plastic substrates by blending therein (D) an alkoxyhydrogensiloxane and (E) a polysiloxane having at least one epoxy group attached to a silicon atom through a carbon atom.

17 Claims, No Drawings

SILICONE RUBBER COMPOSITIONS AND CURED PRODUCTS THEREOF

This invention relates to silicone rubber compositions having improved self adhesion which are suitable as protective coatings and adhesive compositions for electric and electronic parts as well as cured products thereof.

BACKGROUND OF THE INVENTION

Silicone rubber compositions of the type comprising vinylpolysiloxane and hydrogen polysiloxane which are heat cured through hydrosilation in the presence of a platinum catalyst are known in the art. Because of their self adhesion, they are often used as protective coating compositions for electric and electronic parts and adhesive as compositions for bonding electric and electronic parts to substrates. The prior art silicone rubber compositions of this type, however, are not necessarily fully adhesive to various substrates, especially to metallic, ceramic, and plastic substrates.

It was proposed in Japanese Patent Publication Nos. 13508/1978 and 5836/1982 to add various adhesive aids such as hydrogenpoly-siloxanes having an epoxy or alkoxy group, alkoxysilanes or hydrolyzates thereof to these silicone rubber compositions in order to improve their adhesion to various substrates. Despite the addition of these adhesive aids, it is necessary to cure these silicone rubber compositions at minimum temperatures of 100° to 120° C. in order to obtain improved adhesion to the substrate. This is because the adhesion of such compositions depends largely on the curing temperature. Thus, curing at relatively low temperatures of less than 100° C. often results in unsatisfactory adhesion. Therefore, if the silicone rubber compositions used as adhesives for electric and electronic parts are cured at relatively low temperatures, there can be gaps in the adhesion between the composition and the part. These non-adhered gaps can allow moisture and contaminants to penetrate which results in part corrosion and deteriorated insulation.

In addition, low-temperature bonding requirements are increasing in recent years as a new application or for energy saving. There is a need for a silicone rubber composition capable of low-temperature curing to provide improved adhesion.

SUMMARY OF THE INVENTION

An object of the present invention is to provide a new and improved silicone rubber composition having improved self adhesion so that it may be effectively cured to various substrates at relatively low temperatures.

The inventors have discovered that a silicone rubber composition comprising (A) a vinyl-containing diorganopoly-siloxane having at least two $CH_2=CH-Si\equiv$ linkages in a molecule thereof, (B) an organohydrogenpolysiloxane having at least two hydrogen atoms directly attached to silicon atoms in a molecule thereof, (C) platinum or a platinum compound can be improved in adhesion by blending therein (D) an alkoxyhydrogensiloxane of the general formula:

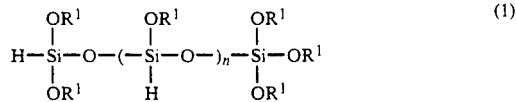

wherein $R^1$ is independently selected from substituted or unsubstituted monovalent hydrocarbon groups free of an aliphatic unsaturated bond and letter n is equal to 0 or a positive integer, and (E) a polysiloxane having at least one epoxy group attached to a silicon atom through a carbon atom directly attached to the silicon atom in a molecule. More particularly, the co-presence of adhesive modifier compounds (D) and (E) in a platinum-catalyzed curing reaction system comprising a vinyl-containing diorganopolysiloxane and an organohydrogenpolysiloxane allows the system to be cured to various substrates at temperatures of 100° C. or lower within relatively short times, thereby achieving firm bond to the substrates. This silicone rubber composition has improved self adhesion to various substrates including metallic, ceramic and plastic substrates and is thus suitable for use as protective coating and adhesive compositions for electric and electronic parts.

Briefly stated, the present invention provides a silicone rubber composition comprising components (A) to (C) as defined above, (D) an alkoxyhydrogensiloxane of formula (1), and (E) an epoxy-containing polysiloxane having at least one epoxy group attached to a silicon atom through a carbon atom directly attached to the silicon atom in a molecule, and cured products thereof.

DETAILED DESCRIPTION OF THE INVENTION

Component (A) forming the silicone rubber composition of the present invention is a vinyl-containing diorganopolysiloxane having at least two $CH_2=CH-Si\equiv$ linkages in a molecule thereof, preferably at either molecular chain end. In the vinyl-containing diorganopolysiloxane, vinyl groups may be present solely at both ends, or at both ends and an intermediate position or positions of a molecule thereof. Preferred are vinyl-containing diorganopolysiloxanes of the general formula (2):

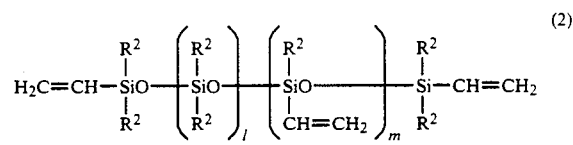

wherein $R^2$, which may be identical or different, is independently selected from substituted or unsubstituted monovalent hydrocarbon groups free of an aliphatic unsaturated bond, letter l is equal to 0 or a positive integer, and m is equal to 0 or a positive integer.

In formula (2), substituent $R^2$ is a substituted or unsubstituted monovalent hydrocarbon group free of an aliphatic unsaturated bond, preferably having 1 to 10 carbon atoms, more preferably 1 to 7 carbon atoms. Examples of substituent $R^2$ include lower alkyl groups such as methyl, ethyl, propyl, and butyl groups; aryl groups such as phenyl, tolyl, and xylyl groups; aralkyl groups such as benzyl and phenylethyl groups; cycloalkyl groups such as cyclohexyl; and substituted ones thereof in which some or all of the hydrogen atoms are replaced by halogen atoms or cyano groups, for example, chloromethyl, cyanoethyl, and 3,3,3-trifluoropropyl groups. Letter l is equal to 0 or a positive integer, and m is equal to 0 or a positive integer, preferably $0 < l+m \leq 10,000$, more preferably $0 < l+m \leq 2,000$ and $0 \leq m/(l+m) \leq 0.2$.

The diorganopolysiloxanes of formula (2) preferably have a viscosity of 10 to 1,000,000 centistokes at 25° C.

Component (B) is an organohydrogenpolysiloxane having at least two hydrogen atoms directly attached to silicon atoms in a molecule thereof. Preferred are organohydrogen-polysiloxanes having at least two hydrogen atoms directly attached to silicon atoms in a molecule thereof as represented by the general formula (3):

$$H_a R^3{}_b SiO_{(4-a-b)/2} \qquad (3)$$

wherein $R^3$, which may be identical or different, is independently selected from substituted or unsubstituted monovalent hydrocarbon groups free of an aliphatic unsaturated bond, and letters a and b are: $0 < a < 2$, $1 \leq b \leq 2$, and $1 \leq a+b \leq 3$.

In formula (3), substituent $R^3$ is a substituted or unsubstituted monovalent hydrocarbon group free of an aliphatic unsaturated bond, preferably having 1 to 10 carbon atoms, more preferably 1 to 7 carbon atoms. Examples of substituent $R^3$ include lower alkyl groups such as methyl, ethyl, propyl and butyl, aryl groups such as phenyl and tolyl, cycloalkyl groups, and aralkyl groups as previously described for $R^2$. Letters a and b are: $0 < a < 2$, $1 \leq b \leq 2$, and $2 \leq a+b \leq 3$, preferably $0.3 \leq a \leq 1$ and $2 \leq a+b \leq 2.7$.

These organohydrogenpolysiloxanes are generally prepared by hydrolysis of chlorosilanes such as $R^3SiHCl_2$, $R^3{}_3SiCl$, $R^3{}_2SiCl_2$, and $R^3{}_2SiHCl$ or by further equilibrating siloxanes resulting from such hydrolysis. Some illustrative, non-limiting examples of the organohydrogen-polysiloxane are given below.

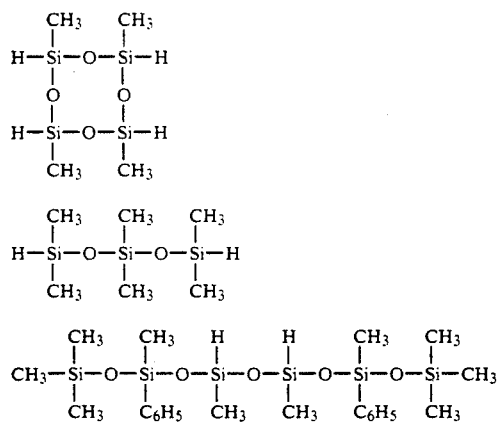

The amount of component (B) or organohydrogenpoly. siloxane blended in the composition is not particularly limited although it is preferably blended in such proportion that the organohydrogenpolysiloxane provides 0.5 to 4 hydrogen atoms, more preferably 2 to 4 hydrogen atoms per vinyl group in diorganopolysiloxane (A).

Component (C) is a platinum catalyst effective for promoting addition reaction between silicon-attached vinyl groups of the vinyl-containing organopolysiloxane as component (A) and silicon-attached hydrogen atoms of the organohydrogenpolysiloxane as component (B). The platinum catalyst may be platinum or platinum compounds which are commonly used in conventional silicone rubber compositions of the type contemplated herein.

Examples of the platinum catalyst include elemental platinum, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_6 \cdot nH_2O$, $PtCl_4 \cdot nH_2O$, $PtCl_2$, $Na_2PtCl_4 \cdot nH_2O$, and $H_2PtCl_4 \cdot nH_2O$. Also useful are complexes of these platinum compounds with hydrocarbons, alcohols, and vinyl-containing cyclic siloxanes.

The platinum catalyst is used in a catalytic amount, for example, in concentrations of 0.1 to 1000 ppm, preferably 0.1 to 100 ppm of platinum based on the total organopolysiloxanes of components (A) and (B).

According to the present invention, a combination of (D) an alkoxyhydrogensiloxane of formula (1) and (E) an epoxy containing polysiloxane is blended as an adhesion modifier to an addition reaction type silicone rubber composition comprising components (A), (B) and (C) defined above.

More particularly, component (D) is an alkoxyhydrogen-siloxane formula (1) which is free of a silicon-to-carbon bond.

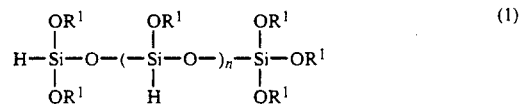

In formula (1), $R^1$, which may be identical or different, is independently selected from substituted or unsubstituted monovalent hydrocarbon groups free of an aliphatic unsaturated bond, preferably having 1 to 10 carbon atoms, more preferably 1 to 7 carbon atoms. Examples of substituent $R^1$ include lower alkyl groups such as methyl, ethyl, propyl, and butyl groups; aryl groups such as phenyl, tolyl, and xylyl groups; aralkyl groups such as benzyl and phenylethyl groups; cycloalkyl groups such as cyclohexyl; and substituted ones thereof in which some or all of the hydrogen atoms are replaced by halogen atoms, for example, chloromethyl and 3,3,3-trifluoropropyl groups, with the lower alkyl groups being preferred. Letter n is equal to 0 or a positive integer, preferably from 0 to 20, more preferably from 0 to 6. The alkoxyhydrogensiloxane of formula (1) is sufficiently effective to attain the objects of the invention insofar as n is at least 0, but preferably in view of compatibility with the base fluid, n ranges from 0 to 6, more preferably n is equal to 0 or 1.

The alkoxyhydrogensiloxanes may be synthesized, for example, by mixing an alkoxysilane of the general formula (4):

wherein $R^1$ is as defined above with an alcohol of the general formula (5):

wherein $R^1$ is as defined above, and adding dropwise pure water, preferably pure water in alcohol to the mixture with cooling whereby reaction readily proceeds without a catalyst. By varying the amount of water added, the molecular weight of the alkoxyhydrogensiloxane of formula (1), that is, the value of n can be controlled. The reaction mixture as such is ready for use as component (D). It is also possible to isolate respective components from the reaction mixture by distillation.

Examples of the trialkoxysilane represented by formula (4) include trimethoxysilane, triethoxysilane, tri-n-propoxysilane, and tri-n-butoxysilane. Examples of the alcohol represented by formula (5) include methanol, ethanol, n-propanol, and n-butanol.

The alkoxyhydrogensiloxanes of formula (1) may be used alone or in admixture of two or more as component (D) of the present composition.

Component (E) is an epoxy-containing polysiloxane having at least one epoxy group attached to a silicon atom through a carbon atom directly attached to the silicon atom in a molecule. Preferred are polysiloxanes of the general formula (6):

$$R^4_c R^5_d SiO_{(4-c-d)/2} \qquad (6)$$

wherein $R^4$ is an epoxy-containing monovalent organic group selected from

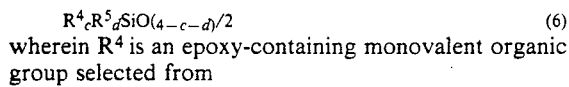

wherein
X is a divalent organic group having 1 to 6 carbon atoms, such as $-(CH_2)_{1-6}-$, $-(CH_2)_{1-3}-O-(CH_2)_{1-3}-$,
$R^5$ is a hydrogen atom or a monovalent hydrocarbon group as defined for $R^2$ and $R^3$, preferably having 1 to 10 carbon atoms, and
letters c and d are $0 < c \leq 1$, $1 \leq d < 3$, $1.5 \leq c+d \leq 3$, preferably $1.8 \leq c+d \leq 2.2$.

Exemplary polysiloxanes are cyclic or straight chain polysiloxanes having one or more cyclic or acyclic epoxy groups added thereto, and their typical examples are given below.

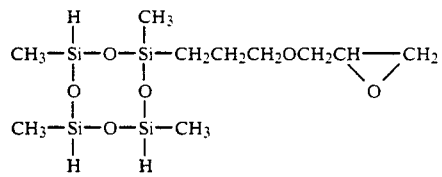

(7)

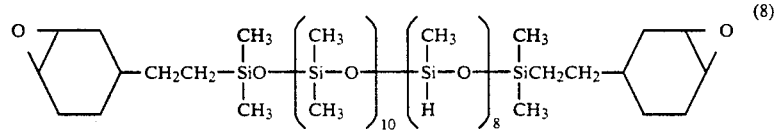

(8)

The amounts of components (D) and (E) blended in the composition are not particularly limited. Preferably, the alkoxyhydrogensiloxane (D) is used in an amount of 0.01 to 5%, more preferably 0.1 to 1% by weight and the epoxy-containing organopolysiloxane (E) is used in an amount of 0.1 to 5%, more preferably 0.2 to 2% by weight, based on the total weight of the vinyl-containing organopolysiloxane (A) and the organohydrogenpolysiloxane (B).

In addition to components (A) to (E), the silicone rubber compositions of the invention may contain other additives such as reinforcing or extending inorganic fillers if desired. Examples of the reinforcing inorganic filler include fumed silica and fumed titanium dioxide, and examples of the extending inorganic filler include fillers commonly used in conventional silicone rubber compositions, such as ground quartz, calcium carbonate, calcium silicate, titanium dioxide, ferric oxide, and carbon black. The fillers need not be blended in the compositions of the invention. When blended, the fillers may be used in amounts of 0 to 200 parts by weight per 100 parts by weight in total of the remaining components of the composition.

The silicone rubber composition of the present invention may be divided into two parts like conventional silicone rubber compositions and cured by combining the two parts although the composition can also be used as a single part if a minor amount of a curing retarder such as acetylene alcohol is added.

In one preferred embodiment where the composition is divided into two parts, a first part is a blend of the vinyl-containing organopolysiloxane (A) with the platinum catalyst (C) and a second part is comprised of the organo-hydrogenpolysiloxane (B). The alkoxyhydrogensiloxane (D) and epoxy-containing organopolysiloxane (E) may be blended in either the first or second part and either together or separately.

The silicone rubber compositions of the present invention cure under conditions as commonly used for conventional silicone rubber compositions. Advantageously, the compositions of the invention can be cured at low temperatures of up to about 100° C., especially about 80° to about 90° C. for short times of about ½ to about 2 hours while achieving improved adhesion. Therefore, the compositions can be cured at relatively low temperatures to various substrates of electric or electronic parts to form protective coatings thereon or used as adhesives for bonding electric or electronic parts to various supports.

There have been described silicone rubber compositions which can be cured to substrates or parts at relatively low temperatures within relatively short time to accomplish a firm bond while preventing the underlying parts from corrosion or insulation loss. Therefore, the compositions of the invention may find a wide variety of applications as protective coating and adhesive compositions for electric and electronic parts. The compositions are also applicable to less heat resistant parts and in new uses while providing energy and labor savings.

EXAMPLE

Examples of the invention are given below by way of illustration and not by way of limitation. All parts are by weight.

First, synthesis of the alkoxyhydrogensiloxane used in Examples is illustrated.

Synthesis of alkoxyhydrogensiloxane

A reactor was charged with 1 mol of trimethoxysilane and 0.5 mol of methanol. With ice cooling, 0.5 mol of pure water was added dropwise to the reactor, allowing reaction to take place.

The reaction mixture was stripped at 120° C. under atmospheric pressure. By gel chromatography (GC), it was found to be a mixture of alkoxyhydrogensiloxanes of the following formula:

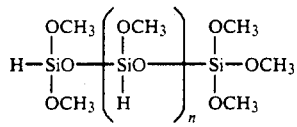

wherein n is an integer of 0 to 6.

EXAMPLE 1 and COMPARATIVE EXAMPLES 1-4

A composition of Example 1 was prepared by blending and thoroughly agitating 100 parts of dimethylpolysiloxane having two methylvinylsiloxane units in a molecule thereof (viscosity 400 centistokes), 5.0 parts of methylhydrogen-polysiloxane containing 1.0 ml/100 gram of $\equiv$SiH bond, 0.05 parts of an octyl alcohol modified solution of chloroplatinic acid (platinum content 2% by weight), 30 parts of ground quartz, 0.15 parts of the alkoxyhydrogensiloxane mixture obtained in Synthesis, and 1.5 parts of an epoxy-containing siloxane of formula (7) obtained by partially adding 1 mol of allyl glycidyl ether to 1 mol of 1,3,5,7-tetramethylcyclotetrasiloxane. The composition was coated to five substrates shown in Table 1 to form a coating of 5 cm×2 cm×2 mm (thick) thereon and then heated at 80° C. for 2 hours for curing, obtaining specimens of Example 1.

The specimens were examined by the following qualitative adhesion test.

Adhesion test

Using a micro-spatula, the cured coating was damaged and stripped from the substrate. Areas of cohesive failure and stripping were determined to evaluate the degree of adhesion according to the following criterion.

O: good adhesion (cohesive failure>80%)
Δ: partial adhesion (cohesive failure 20-80%)
X: no adhesion (cohesive failure<20%)

Comparative compositions were prepared using approximately the same formulation and procedure as above. Comparative Example 1 was a composition which omitted the epoxy-containing siloxane, Comparative Example 2 was a composition which omitted the alkoxyhydrogensiloxane mixture, Comparative Example 3 was a composition which omitted both the epoxy-containing siloxane and trimethoxysilane hydrolyzate, and Comparative Example 4 was a composition which used 0.15 parts of trimethoxysilane instead of the alkoxyhydrogensiloxane mixture. Coated specimens were prepared from these compositions and subjected to the adhesion test.

The results are shown in Table 1.

TABLE 1

|  | E1 | CE1 | CE2 | CE3 | CE4 |
|---|---|---|---|---|---|
| Alkoxyhydrogen-siloxane mixture | yes | yes | — | — | trimethoxy-silane |
| Epoxy-containing siloxane | yes | — | yes | — | yes |
| Substrate |  |  |  |  |  |
| Aluminum | O | X | X | X | Δ |
| Stainless steel | O | X | X | X | Δ |
| Nickel | O | X | X | X | X |
| Silicon wafer | O | X | X | X | Δ |
| Glass | O | Δ | X | X | Δ |

As seen from Table 1, the organopolysiloxane composition of the invention (Example 1) adhered firmly to all the aluminum, stainless steel, nickel, silicon wafer and glass substrates. In contrast, the compositions which did not contain the alkoxyhydrogensiloxane mixture and/or epoxy-containing siloxane (Comparative Examples 1-3) did not adhere well to the metal substrates, and the composition which contained the epoxy-containing siloxane, but trimethoxysilane instead of the alkoxyhydrogensiloxane mixture (Comparative Example 4) did not adhere firmly to the substrates.

EXAMPLE 2 and COMPARATIVE EXAMPLES 5-7

A composition of Example 2 was prepared by blending and thoroughly agitating 50 parts of dimethylpolysiloxane having two methylvinylsiloxane units in a molecule thereof (viscosity 5000 centistokes), 50 parts of a copolymer consisting of $SiO_2$ units, trimethylsiloxy units and dimethylvinylsiloxy units in a molar ratio of 1:1:0.15, 6.0 parts of methylhydrogenpolysiloxane containing 1.2 mol/100 gram of $\equiv$SiH bond, 0.05 parts of an octyl alcohol solution of chloroplatinic acid (platinum content 2% by weight), 0.05 parts of siloxane-modified acetylene alcohol, 0.35 parts per 100 parts of the dimethylpolysiloxane of the alkoxyhydrogen. siloxane mixture obtained in Synthesis, and 2.0 parts of an epoxy-containing siloxane of formula (8). The composition was coated to nine substrates shown in Table 2 to form a coating of 5 cm×2 cm×2 mm (thick) thereon and then heated at 100° C. for 1 hour for curing, obtaining specimens of Example 2. The specimens were examined for adhesion as in Example 1.

Comparative compositions were prepared using approximately the same formulation and procedure as above. Comparative Example 5 was a composition which omitted the epoxy-containing siloxane, Comparative Example 6 was a composition which omitted the alkoxyhydrogensiloxane mixture, and Comparative Example 7 was a composition which omitted both the epoxy-containing siloxane and alkoxy. hydrogensiloxane mixture. Coated specimens were prepared from these compositions and subjected to the adhesion test.

The results are shown in Table 2.

TABLE 2

|  | E2 | CE5 | CE6 | CE7 |
|---|---|---|---|---|
| Alkoxyhydrogensiloxane mixture | yes | yes | — | — |
| Epoxy-containing siloxane | yes | — | yes | — |
| Substrate |  |  |  |  |
| Aluminum | O | X | X | X |
| Stainless steel | O | X | X | X |
| Nickel | O | X | X | X |
| Silicon wafer | O | Δ | Δ | X |
| Glass | O | Δ | Δ | X |
| Polyester | O | Δ | Δ | X |
| Polyimide | O | X | X | X |

TABLE 2-continued

|  | E2 | CE5 | CE6 | CE7 |
|---|---|---|---|---|
| Glass-reinforced epoxy | ○ | △ | △ | X |
| Phenolic resin | ○ | △ | △ | X |

As seen from Table 2, the organopolysiloxane composition of the invention (Example 2) adhered firmly to all metallic substrates of aluminum, stainless steel and nickel, silicon wafer and glass substrates, and plastic substrates of polyester, polyimide, glass-reinforced epoxy resin and phenolic resin, as compared with the compositions which did not contain the alkoxyhydrogensiloxane mixture and/or epoxy-containing siloxane (Comparative Examples 5.7).

EXAMPLE 3

The alkoxyhydrogensiloxane mixture obtained in Synthesis example was fractionated by distillation, isolating the following compounds.

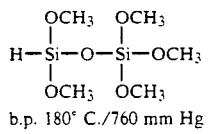

b.p. 180° C./760 mm Hg

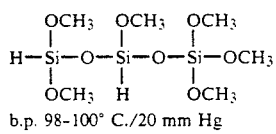

b.p. 98-100° C./20 mm Hg

Two compositions were prepared using the same formulation and procedure as in Example 1 except that each of these isolated compounds was blended instead of the alkoxyhydrogensiloxane mixture. They were tested for adhesion to find equivalent results to the results of the mixture.

EXAMPLE 4

The procedure of Example 3 was repeated according to Example 2, finding equivalent results to the results of Example 2.

The results of Examples 3 and 4 reveal that the alkoxy. hydrogensiloxane compounds, when used alone, are as effective for improving adhesion as the alkoxyhydrogen-siloxane mixture.

Although some preferred embodiments have been described, many modifications and variations may be made thereto in the light of the above teachings. It is therefore to be understood that within the scope of the appended claims, the invention may be practiced otherwise than as specifically described.

We claim:

1. A silicone rubber composition comprising;
   (A) a vinyl-containing diorganopolysiloxane having at least two $CH_2=CH-Si\equiv$ linkages in a molecule thereof,
   (B) an organohydrogenpolysiloxane having at least two hydrogen atoms directly attached to silicon atoms in a molecule thereof,
   (C) platinum or a platinum compound,
   (D) an alkoxyhydrogensiloxane of the general formula:

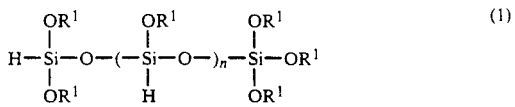

wherein $R^1$ is independently selected from substituted or unsubstituted monovalent hydrocarbon groups free of an aliphatic unsaturated bond and letter n is equal to 0 or a positive integer, and
   (E) an epoxy-containing polysiloxane having at least one epoxy group attached to a silicon atom through a carbon atom directly attached to the silicon atom in a molecule.

2. The composition as recited in claim 1, wherein in formula (1), $R^1$ is independently selected from monovalent hydrocarbon groups having 1 to 10 carbon atoms and letter n is an integer of from 0 to 20.

3. The composition as recited in claim 1, wherein the alkoxyhydrogen-siloxane (D) is synthesized by
   mixing an alkoxysilane of the general formula (4):

wherein $R^1$ is as defined above with an alcohol of the general formula (5):

$$R^1OH \qquad (5)$$

wherein $R^1$ is as defined above, and
   adding dropwise water to the mixture, allowing reaction to proceed in the reaction mixture.

4. The composition as recited in claim 3, wherein the entire reaction product mixture is used as the alkoxyhydrogensiloxane (D).

5. The composition as recited in claim 3, wherein a reaction product is isolated from the reaction mixture to provide the alkoxy-hydrogensiloxane (D).

6. The composition as recited in claim 1, wherein the epoxy-containing polysiloxane (E) is of the general formula (6):

$$R^4_c R^5_d SiO_{(4-c-d)/2} \qquad (6)$$

wherein $R^4$ is an epoxy-containing monovalent organic group selected from

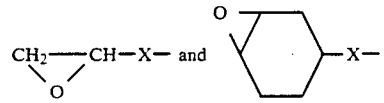

wherein
   X is a divalent organic group having 1 to 6 carbon atoms,
   $R^5$ is a hydrogen atom or a monovalent hydrocarbon group having 1 to 10 carbon atoms, and
   letters c and d are $0<c\leq 1, 1\leq d<3$, and $1.5\leq c+d\leq 3$.

7. A cured product obtained by curing the silicone rubber composition of any one of claims 1 to 6.

8. The composition as recited in claim 1, wherein the vinyl-containing diorganopolysiloxane (A) is of the general formula (2):

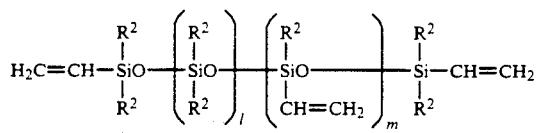

wherein $R^2$, which may be identical or different, is independently selected from substituted or unsubstituted monovalent hydrocarbon groups free of an aliphatic unsaturated bond, letter l is equal to 0 or a positive integer, and m is equal to 0 or a positive integer.

9. The composition as recited in claim 8, wherein $R^2$ has 1 to 10 carbon atoms.

10. The composition as recited in claim 8, wherein the sum of l and m is in the range of $0 < l+m \leq 10,000$.

11. The composition as recited in claim 10, wherein l and m are in the range of $0 < l+m \leq 2,000$ and are in a proportion of $0 \leq m/(l+m) \leq 0.2$.

12. The composition as recited in claim 2, wherein $R^1$ is selected from the group consisting of methyl, ethyl, propyl, butyl, phenyl, tolyl, xylyl, benzyl, phenylethyl, cyclohexyl, and halogen substituted derivatives thereof.

13. The composition as recited in claim 12, wherein n is an integer of from 0 to 6.

14. The composition as recited in claim 13, wherein n is 0 or 1.

15. The composition as recited in claim 1, wherein component (D) is used in an amount of 0.01 to 5% by weight and component (E) is used in an amount of 0.1 to 5% by weight, each based on the total weight of components (A) and (B).

16. The composition as recited in claim 15, wherein component (D) is used in an amount of 0.1 to 1% by weight and component (E) is used in an amount of 0.2 to 2% by weight, each based on the total weight of components (A) and (B).

17. The composition as recited in claim 6, wherein the epoxy-containing polysiloxane (E) is:

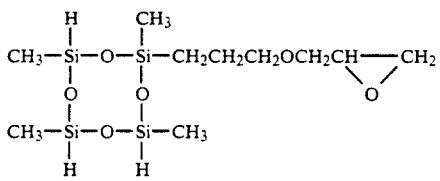

or

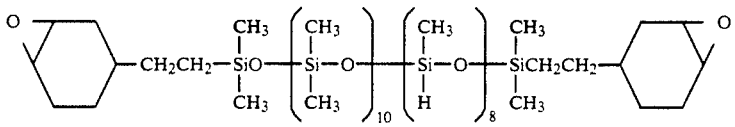

* * * * *